April 28, 1925.
R. A. WATERMAN
ROD HOLDER
Filed June 16, 1924
1,535,703
FIG_1_
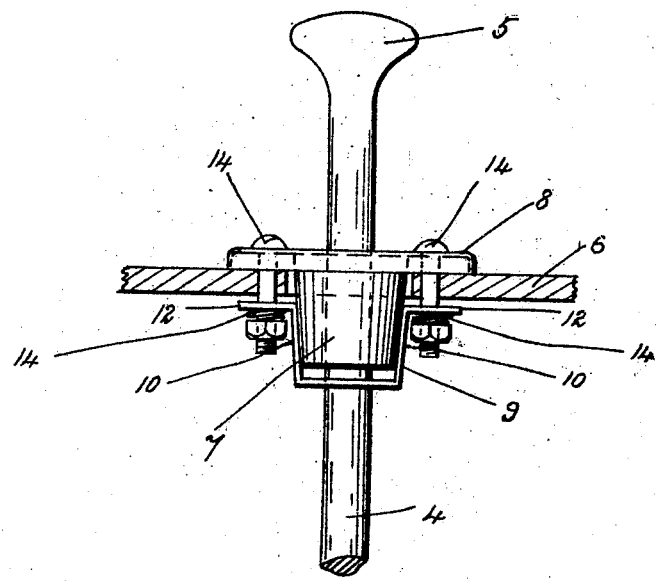
FIG_2_
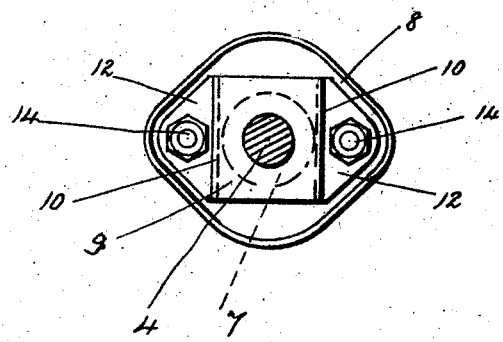
Inventor
Royal A. Waterman
by Hubert W. Jenner
Attorney Patented Apr. 28, 1925.

1,535,703

UNITED STATES PATENT OFFICE.

ROYAL ALTON WATERMAN, OF GRAND RAPIDS, MICHIGAN.

ROD HOLDER.

Application filed June 16, 1924. Serial No. 720,471.

*To all whom it may concern:*

Be it known that I, ROYAL A. WATERMAN, a citizen of the United States, residing at Grand Rapids, in the county of Kent and State of Michigan, have invented certain new and useful Improvements in Rod Holders, of which the following is a specification.

This invention relates to devices for holding movable rods in any position in which they are placed, by frictional resistance of predetermined strength, and so as to prevent premature movement of the rods; and it consists in the novel construction and combination of the parts hereinafter fully described and claimed.

In the drawings, Figure 1 is a side view of a rod holder constructed according to this invention, showing a portion of the support in section. Fig. 2 is a plan view of the rod holder from below, and detached from the support.

The rod 4 is any slidable or revoluble rod such as used to control a throttle valve on a motor car, and 5 is its operating knob. The support 6 in which the rod is movable may be the dash plate of the car, or any other similar stationary part.

In order to hold the rod in any desired position a block 7 of elastic material, such as india rubber or cork, is provided, and is arranged to bear on the rod. The block 7 is tapered externally, and it preferably is a conical sleeve which encircles the rod. A fastening plate 8 is arranged on one side of the support 6 around the rod. An adjustable plate 9, channel-shaped in cross-section, is provided on the other side of the support, and is arranged to straddle the block 7. The sides 10 of the plate 9 are inclined to correspond with the taper of the block, and are provided with lugs 12 which are arranged parallel to the fastening plate 8.

Adjusting bolts 14 are arranged in holes in the plate 8, support 6 and lugs 12, and spring washers 14 are preferably provided between the lugs 12 and the nuts 15 which are screwed on the bolts.

When the nuts are screwed up they tighten the grip of the block on the rod, and the resistance can be made so that any predetermined amount of force is necessary to move the rod. The spring washers permit the channel-shaped plate to slide a little with the rod so as to bear on the block with elastic pressure.

What I claim is:

1. A rod holder, comprising a tapered block of elastic material adapted to bear on the rod, a fastening plate, a plate channel-shaped in cross-section and arranged to straddle the said block, and bolts connecting the two plates and operating to contract the said block upon the rod.

2. A rod holder, comprising a tapering sleeve of elastic material adapted to bear on the rod, a fastening plate, a plate channel-shaped in cross-section and adapted to fit over the said sleeve, and bolts connecting the two plates and operating to contract the said sleeve upon the rod.

3. A rod holder, comprising a tapering sleeve of elastic material adapted to bear on the rod, a fastening plate, a plate channel-shaped in cross-section and adapted to fit over the said sleeve and having lugs arranged parallel to the fastening plate, and bolts passing through holes in the fastening plate and in the said lugs and having spring washers, and operating to hold the said sleeve in engagement with the rod.

In testimony whereof I have affixed my signature.

ROYAL ALTON WATERMAN.